United States Patent [19]

Davis et al.

[11] Patent Number: 4,894,602

[45] Date of Patent: Jan. 16, 1990

[54] OVERVOLTAGE PROTECTION SYSTEM FOR MARINE IGNITION AND REGULATOR CIRCUITRY

[75] Inventors: James A. Davis, Ripon; William B. Mayer, Oshkosh, both of Wis.

[73] Assignee: Brunswick Corporation, Skokie, Ill.

[21] Appl. No.: 201,545

[22] Filed: Jun. 2, 1988

[51] Int. Cl.$^4$ ............................ H02P 9/04; F02P 9/00

[52] U.S. Cl. ....................................... 322/38; 123/335; 310/70 A

[58] Field of Search .......................... 290/35, 40 F, 41; 322/91, 28, 29, 38; 310/71 A; 123/335

[56] References Cited

U.S. PATENT DOCUMENTS

RE 31,230 5/1983 Swift et al. ............................ 322/91

4,570,595 2/1986 Andreasson .................... 123/335 X 4,661,761 4/1987 Katsumata ........................ 322/38 X 4,726,798 2/1988 Davis .................................. 440/75

*Primary Examiner*—R. J. Hickey

*Attorney, Agent, or Firm*—Andrus, Sceales, Starke & Sawall; Robert C. Curfiss

[57] ABSTRACT

In a marine propulsion system including an internal combustion engine driving a voltage generator (14) supplying system voltage (line 26) which is supplied to ignition circuitry (10) providing spark ignition for running the engine in normal operation, overvoltage protection is provided for both the voltage generator regulator (12) and the ignition circuitry. If sensed system voltage is below a given threshold ($V_T$), normal operation of the engine is continued. If sensed system voltage is above the given threshold, engine speed is reduced to reduce the generated voltage.

1 Claim, 2 Drawing Sheets

OVERVOLTAGE PROTECTION SYSTEM FOR MARINE IGNITION AND REGULATOR CIRCUITRY

BACKGROUND AND SUMMARY

The invention relates to marine propulsion systems including an internal combustion engine driving a voltage generator, e.g. a permanent magnet or wound field alternator, generating output voltage which is sensed by a voltage regulator and charges a marine battery and which supplies voltage to ignition circuitry and other boat systems providing spark ignition for running the engine.

In the prior art, overvoltage protection is provided in the regulator by turning on a pair of auxiliary SCR's to shunt output current. Overvoltage protection for the ignition circuitry is provided by a limiting zener diode. A problem in the prior art is that the setting of the threshold overvoltage for the two types of protection are at cross-purposes. On the one hand, it is desired to set the threshold overvoltage for the ignition circuitry higher than the threshold for the regulator, in order to protect the zener diode, because the zener diode cannot protect against relatively long powerful transients such as produced by permanent magnet alternator charging systems in a marine engine. On the other hand, it is desired to set the threshold overvoltage for the regulator higher than the threshold for the ignition circuitry, in order to minimize repetitive use of the auxiliary shunting SCR's, to in turn prevent overheating and failure thereof.

The present invention addresses and solves the noted trade-off problem, and achieves both of the previously incompatible desirable results, and does so with existing circuitry already present in the system.

Microprocessor based ignition control systems typically include a voltage sensor sensing the magnitude of the alternator output voltage, either directly at the alternator or at another point in the circuit and as affected by various voltage drops in the circuit, which voltage is known as the system voltage. The ignition control system adjusts dwell according to the sensed system voltage during normal engine operation to maintain substantially constant energy spark ignition. In preferred form, the present invention uses the existing voltage sensor and determines whether the system voltage is above a given threshold $V_T$, and if not, continuing normal engine operation with normal dwell adjustment, and if so, altering the dwell to full on or full off or otherwise terminating spark ignition, to reduce engine speed and hence reduce the system voltage generated by the alternator. Sensing of the system voltage is continued, and engine speed is reduced until the voltage drops below the given threshold $V_T$. The threshold $V_T$ is selected to be lower than the overvoltage threshold of the noted zener diode protecting the ignition circuitry and is also selected to be lower than the overvoltage threshold of the regulator to protect the noted auxiliary shunting SCR's.

The invention also provides protection in wound field alternator applications. Wound field alternators typically include transistor circuitry in the regulator which is subject to failure in a short circuit condition, and also include brushes which are subject to mechanical connection shorting to ground, both of which can cause full output current and an overvoltage condition. The present invention provides protection against both of these and other failure modes of wound field alternators by sensing the system voltage and reducing engine speed until the voltage drops below the given threshold $V_T$.

DETAILED DESCRIPTION PRIOR ART

Figure 1:
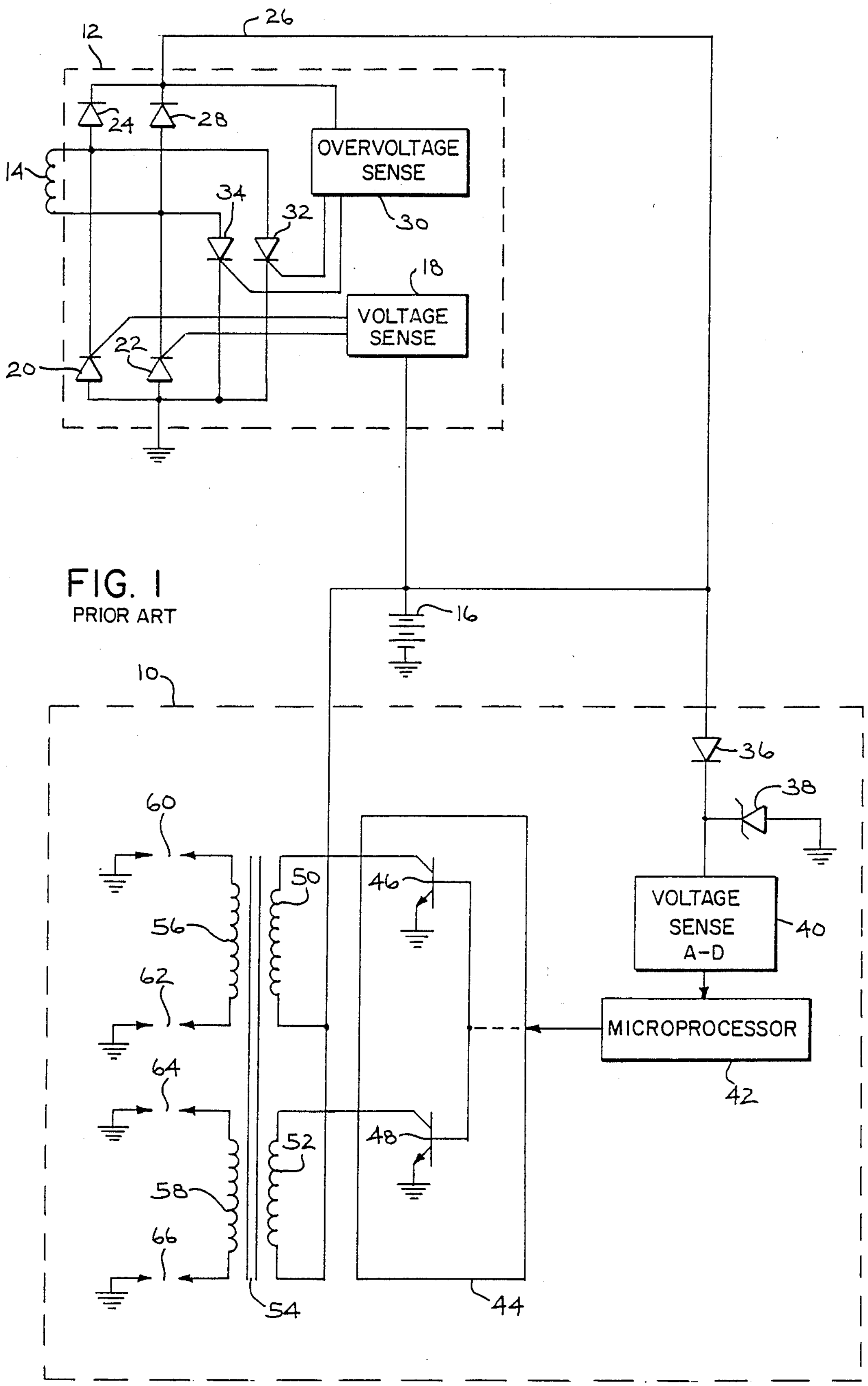
FIG. 1 PRIOR ART
FIG. 1 is a schematic circuit diagram illustrating voltage regulator circuitry and ignition circuitry for a marine engine as known in the prior art.

FIG. 1 show ignition circuitry 10 providing spark ignition for running an internal combustion engine of a marine propulsion system, for example as shown in U.S. Pat. No. 4,726,798, incorporated herein by reference. FIG. 1 also shows voltage regulator circuitry 12 sensing and regulating the voltage generated by a voltage generator, e.g. an alternator, driven by the engine. This voltage is generated across alternator output coil 14 and is supplied to ignition circuitry 10 providing spark ignition for running the engine, and is also supplied to marine battery 16 to provide charging current therefore.

Voltage sense circuitry 18 in regulator 12 senses battery voltage, and turns on SCR's 20 and 22 when battery voltage is below some level, typically 14.2 volts. Current then flows from the top of coil 14 through rectifying diode 24 and line 26 to battery 16, with return through SCR 22 to the bottom of coil 14 during one half-cycle. During the other half-cycle, current flows from the bottom of coil 14 through rectifying diode 28 and line 26 to battery 16, with return through SCR 20 to the top of coil 14. Overvoltage sense circuitry 30 senses the voltage on line 26 and turns on auxiliary SCR's 32 and 34 when such voltage rises above a given threshold. Conduction of SCR 32 shunts current from coil 14 during the noted one half-cycle, and conduction of SCR 34 shunts current from coil 14 during the noted other half-cycle. In this manner, the voltage on line 26 is regulated to prevent an overvoltage condition, all is known in the art.

Figure 2:
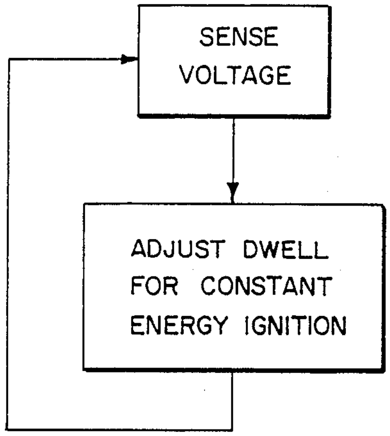
FIG. 2 PRIOR ART
FIG. 2 is a flow diagram showing the program for the microprocessor of FIG. 1 as known in the prior art.

Ignition circuitry 10 includes a diode 36 providing protection against reverse polarity battery connection. Zener diode 38 provides voltage limiting for protection against a given overvoltage threshold. Voltage sense circuit 40 senses the system voltage on line 26 through diode 36 and provides an analog to digital conversion for input to microprocessor 42 which controls an ignition circuit 44 including bipolar NPN transistors 46 and 48 providing ignition pulses for primary windings 50 and 52 of coil 54. The coil has secondary windings 56 and 58 supplying high voltage to spark plugs 60, 62, 64, 66 for spark ignition of the engine. Windings 50 and 52 are connected to the battery 16 and output line 26. When transistor 46 is on, current flows from battery 16 and/or output line 26 through primary winding 50 and through transistor 46. As is conventional, when transistor 46 turns off, the interruption of current flow through primary winding 50 induces a pulse in secondary winding 56 which in turn provides the ignition pulse providing spark ignition. The operation of remaining transistors or other switches such as 48 and other primary and second windings such as 52 and 58 is comparable. It is also typical and known in the art to use microprocessor 42 to vary or adjust dwell according to the voltage magnitude sensed by voltage sense circuit 40, as shown in FIG. 2. As the system voltage on line 26 increases, dwell is reduced, i.e. transistors 46 and 48 are on for a shorter length of time. This because there is higher available voltage to supply the requisite energy. Conversely, as the voltage on line 26 as sensed by voltage sense circuit 40 decreases, dwell is increased, i.e. the on time of transistors 46 and 48 is increased. This continuing dwell adjustment provides substantially constant energy spark ignition.

In marine engines, it is common to use permanent magnet charging systems. Because of heating problems, series type regulators are used at higher current levels, usually 25 amps and higher. Typically, SCR's such as 20 and 22 are used to connect alternator coil 14 to battery 16 when the battery voltage is below some level, typically 14.2 volts as above noted. The problem with this charging system is that if the battery is disconnected for some reason during the halfwave output, the then conducting SCR 20 or 22 cannot turn off until the half-cycle is complete. As a result, the voltage on the regulator output 26 rises to near the open circuit voltage of coil 14, typically 100 volts at reasonable engine speeds. Because this overvoltage transient is produced by the alternator and is not just a relatively short inductive transient, it contains significant energy and lasts for a relatively long period of time, as compared to the load transient associated with wound field alternators. Therefore, it is common to provide overvoltage protection in the permanent magnet alternator regulator. This protection typically takes the form shown, with auxiliary SCR's 32 and 34, though other schemes may also be used.

When the overvoltage condition is detected by overvoltage sense circuit 30, whichever of SCR's 32 or 34 is forward biased then turns on and the alternator output is short circuited through SCR 32 or 34 and SCR 22 or 20, respectively, protecting all of the devices connected to output lead 26 from overvoltage. Normally, the charging system remains in the off condition, since the battery has been disconnected and there is no current available to turn on SCR 20 or 22 for the next half-cycle. As a result, and for cost reasons, SCR's 32 and 34 are normally much lower in current rating than SCR's 20 and 22.

In a typical 40 amp system such as used on a Mercury Marine 3.7 liter engine, SCR's 32 and 34 have a rating of 16 amps, average, half-cycle. In normal usage, these SCR's are more than adequate. They will conduct the full output of the alternator for several seconds. However, if the battery is repeatedly disconnected, requiring SCR 32 or 34 to conduct, and then reconnected, so that SCR 20 or 22 will again be turned on, and then again disconnected, so that SCR 32 or 34 will conduct, and so on, heat will build up in SCR 32 and/or 34 to the point that they will ultimately fail in the open mode. When this happens, output lead 26 will no longer be protected from overvoltage. To minimize the inadvertent or exercised use of the overvoltage protection circuit from voltage caused by the IR drop of the wiring, when added to the battery voltage, it is desirable to set the overvoltage protection threshold as high as possible. This has typically been set at about 28 to 31 volts.

In electronic ignition systems, it is also common to protect against overvoltage and reverse battery connection. Diode 36 protects against reverse battery connection, as above noted. Zener diode 38 protects the ignition circuitry against overvoltage. Zener diode 38 cannot protect against relatively long powerful transients such as produced by permanent magnet alternator charging systems.

If the reverse breakover threshold voltage of zener diode 38 is such that it protects at a lower voltage than the regulator overvoltage protection, then zener diode 38 will eventually fail. It is therefor necessary that the regulator overvoltage protection provided by overvoltage sense circuit 30 be at a lower voltage than the electronic ignition overvoltage protection. Typical values would be 25 to 28 volts for the overvoltage protection of ignition system 10, and 22 to 25 volts for regulator 12. Normally, the overvoltage protection in regulator 12 will protect ignition system 10, and the ignition system's overvoltage protection will not be needed.

The lower setting of the regulator overvoltage sense circuit 30 causes more usage thereof and hence more frequent turn-on of SCR's 32 and 34, which in turn leads to open type failures of SCR 32 and/or 34 and loss of overvoltage protection within regulator 12. Even without the IR drop of the wiring, repeated disconnection and reconnection of the battery as above described can cause open type failure of SCR 32 and/or 34, again resulting in loss of overvoltage protection within the regulator. When this happens and an overvoltage condition exists, and zener diode 38 will also fail in a short time.

In microprocessor based ignition systems, it is common practice in the prior art to control ignition dwell time as a function of battery voltage and output voltage on line 26 to provide nearly constant energy to the spark plugs, as above noted, regardless of battery voltage or output voltage. This technique is also used in non-microprocessor based electronic ignitions.

PRESENT INVENTION

The present invention uses the voltage sense circuitry 40 already present in the electronic ignition circuitry 10 to terminate ignition and stop the firing of the spark plugs if the system voltage on line 26 exceeds a given threshold level. This level is chosen well above the normal operating voltage, but below the overvoltage protection of regulator 12 and below the overvoltage protection of ignition circuitry 10. Ignition is terminated by reducing dwell to zero, or by increasing dwell to 100% which provides the additional benefit of loading the system to help dissipate the overvoltage condition. In another embodiment, ignition output pulses are eliminated, making such system applicable to engines using ignition systems other than inductive. In still another embodiment, ignition timing is altered, to cause the engine speed to decrease.

Once the overvoltage condition is detected, spark ignition is modified or terminated long enough for the engine to slow down so that the alternator output voltage will decrease low enough for the regulator overvoltage protection SCR's 32 and 34 to cool. These SCR's are already large enough to accept full output for a few seconds without failure. If spark ignition is modified or terminated at a voltage level just below the overvoltage protection of regulator 12, SCR's 32 and 34 are still protected. Even if SCR's 32 and 34 turn on, engine speed decreases rapidly enough and hence alternator output decreases enough so that SCR's 32 and 34 do not burn out.

Figure 3:
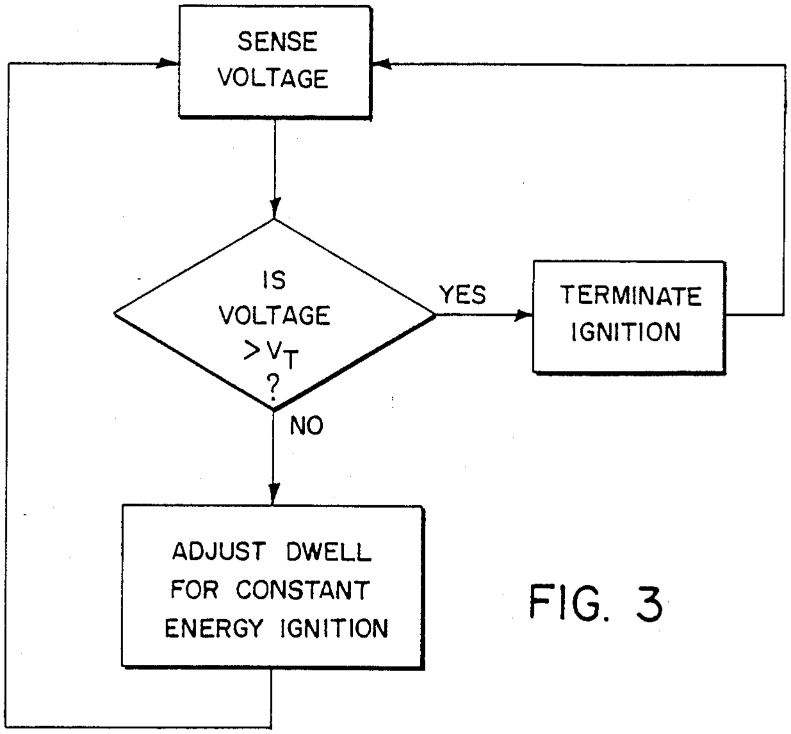
FIG. 3 is a flow diagram illustrating operation in accordance with the invention.

FIG. 3 shows the method in accordance with the invention and the modified program over FIG. 2 for microprocessor 42 of FIG. 1. The method comprises sensing the system voltage as converted by voltage sense circuitry 40, determining whether the system voltage is above a given threshold $V_T$, and if not, continuing the above noted normal operation by adjusting dwell to maintain substantially constant energy for spark ignition, as in FIG. 2, and if the voltage is above $V_T$, terminating the spark ignition to reduce engine speed, to reduce the alternator output voltage on line 26 and hence reduce the system voltage. The invention contemplates reduction of engine speed by other means, such as by terminating or reducing fuel flow. In the preferred embodiment, spark ignition is altered to reduce engine speed, because of the economy of using the existing ignition circuitry. It is further preferred that the spark ignition be altered to terminate same to stall the engine and reduce engine speed as rapidly as possible and hence rapidly reduce the system voltage.

As shown in FIG. 3, after termination of spark ignition, the system voltage is again sensed, and there is continuing sensing of the system voltage and reduction of engine speed until the system voltage drops below $V_T$. The system then resumes normal operation and ignition dwell is adjusted in accordance with the system voltage to maintain substantially constant energy for spark ignition, as in FIG. 2.

Voltage sensing circuitry 40 senses the system voltage above $V_T$ for reduction of engine speed and also senses the system voltage below $V_T$ to adjust dwell in accordance with such voltage to maintain the noted substantially constant energy for spark ignition in normal operation. The same voltage sensing circuitry 40 thus serves both purposes.

The method of the present invention protects both voltage regulator 12 and ignition circuitry 10 against overvoltage output from the alternator. $V_T$ is selected to be below a given overvoltage for protection of voltage regulator 12 and below a given overvoltage for protection of ignition circuitry 10. This solves the above noted trade-off, and does so in a particularly simple and effective manner by merely reducing engine speed until the system voltage on line 26 decreases to a safe level.

It is recognized that various equivalents, alternatives and modifications are possible within the scope of the appended claims. For example, when an overvoltage condition is sensed, ignition may be altered for a period of time such that the engine stalls and must be restarted, providing an additional cool-off time for the overvoltage protection devices.

We claim:

1. A marine propulsion system comprising an internal combustion engine driving a voltage generator supplying system voltage to ignition circuitry providing spark ignition for running said engine in normal operation, said ignition circuitry including voltage sensing circuitry sensing said system voltage and adjusting ignition dwell in accordance therewith to maintain substantially constant energy for said spark ignition in said normal operation, a marine battery charged by said system voltage, a voltage regulator sensing and regulating said system voltage, said voltage sensing circuitry of said ignition circuitry sensing said system voltage and responding to system voltage below a given threshold to continue said normal operation and said substantially constant energy for said spark ignition, said voltage sensing circuitry of said ignition circuitry responding to system voltage above said given threshold to reduce engine speed, to reduce said system voltage, wherein said given threshold is below a given overvoltage for protection of said ignition circuitry and is also below a given overvoltage for protection of said voltage regulator, and wherein the same said voltage sensing circuitry of said ignition circuitry provides all three of said functions of (a) sensing system voltage for adjusting ignition dwell to maintain substantially constant energy for said spark ignition, (b) sensing system voltage for protection of said ignition circuit against overvoltage, and (c) sensing system voltage for protection of said regulator against overvoltage.

* * * * *